(12) United States Patent
Kim

(10) Patent No.: US 6,848,800 B2
(45) Date of Patent: Feb. 1, 2005

(54) BACKLIGHT DEVICE AND METHOD OF FABRICATING THE SAME

(75) Inventor: Jae Bum Kim, Kyongsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/326,489

(22) Filed: Dec. 23, 2002

(65) Prior Publication Data

US 2003/0123248 A1 Jul. 3, 2003

(30) Foreign Application Priority Data

Dec. 29, 2001 (KR) ........................................ P2001-88467

(51) Int. Cl.[7] .............................................. G01D 11/28
(52) U.S. Cl. ........................... 362/26; 362/31; 362/149; 362/339
(58) Field of Search .............................. 362/26, 27, 31, 362/149, 150, 151, 339; 349/65, 62, 149, 150, 151

(56) References Cited

U.S. PATENT DOCUMENTS

| | | | | |
|---|---|---|---|---|
| 5,680,233 A | * | 10/1997 | Faris et al. .................... 349/61 |
| 5,710,097 A | * | 1/1998 | Staral et al. .................. 503/227 |
| 5,835,139 A | * | 11/1998 | Yun et al. ....................... 349/58 |
| 5,838,412 A | * | 11/1998 | Ueda et al. .................. 349/150 |
| 6,148,075 A | * | 11/2000 | Inubushi et al. ............. 379/368 |
| 6,412,969 B1 | * | 7/2002 | Torihara et al. ............... 362/31 |

FOREIGN PATENT DOCUMENTS

| JP | 41016261 | * | 8/1996 | ............. F21V/8/00 |
| JP | 2001-076526 | | 3/2001 | |

* cited by examiner

Primary Examiner—Sandra O'Shea
Assistant Examiner—Mark Tsidulko
(74) Attorney, Agent, or Firm—Morgan, Lewis & Bockius LLP

(57) ABSTRACT

A backlight device including a light source, a light guiding plate arranged at one side of the light source for transferring a light from the light source, at least one diffusion sheet and prism sheet sequentially arranged on the light guiding plate, a reflection sheet placed beneath the light guiding plate and having a stepped portion formed at a light incident portion thereof, and a main supporting frame accommodating the light source, the light guiding plate, the diffusion sheet, the prism sheet, and the reflection sheet.

19 Claims, 3 Drawing Sheets

BACKLIGHT DEVICE AND METHOD OF FABRICATING THE SAME

The present invention claims the benefit of Korean Patent Application No. P2001-88467 filed in Korea on Dec. 29, 2001, which is hereby incorporated by reference.

BACKGROUND OF THE INVENTION

1. Field of the Invention

The present invention relates to a backlight device, and more particularly, to an edge light type backlight device suitably used for a liquid crystal display.

2. Discussion of the Related Art

Research on flat panel displays continues to be performed. Among such flat panel displays are liquid crystal display (LCD) devices, field emission display (FED) devices, electro-luminescence display (ELD) devices, and plasma display panels (PDP).

In general, LCD devices are gaining popularity in monitors for notebook and desktop personal computers (PC's), and liquid crystal televisions because of their high contrast ratio, gray scale display suitable for displaying motion pictures, and their thin characteristics. However, LCD devices do not emit light on there own, and are provided with a separate external light source for irradiating light, e.g., a backlight device. The backlight device includes a projection type and an edge light type backlight devices. The edge light type backlight device being the most commonly used.

In the edge light type backlight device, a tube-shaped light source such as a fluorescent lamp (hot cathode, cold cathode) or the like is installed at a side portion of the LC panel, and the light from the fluorescent lamp is irradiated onto the entire surface of the LC panel screen using a transparent light guiding plate.

A liquid crystal display device according to the related art will be described with reference to the accompanying drawings.

FIG. 1 shows an LCD device according to the related art that includes a liquid crystal (LC) panel 100 comprising a thin film transistor (TFT) substrate 1, a color filter substrate 2, and a liquid crystal layer interposed therebetween, a driving circuit unit 101 for applying a voltage to the LC panel 100 and supplying a signal for driving the liquid crystal molecules of the liquid crystal layer, a backlight device installed below the LC panel 100 for transferring light irradiated from a lamp 111 towards the LC panel 100 through a light guiding plate 113, a frame for supporting the LC panel 100 and the backlight device, and a bezel part 104 coupled to the outer portions of the frame 105 to enclose the edge portions except for the effective display area where an image is displayed.

The lamp 111 functions as the light source and is located at an edge portion below the LC panel 100. In a monitor or LCD device for television requiring high luminance, two or more lamps 111 may be used as shown in FIG. 1.

FIG. 2 shows the backlight device which includes the lamp 11 installed at the left or right side for supplying light, a lamp housing 12 for fixing the lamp 11 and concentrating the light emitted from the lamp 11 towards the light guiding plate 13, a reflection sheet 14 arranged beneath the light guiding plate 13 for reflecting light leaked through an opposite direction to the LC panel toward the light guiding plate 13, a diffusion sheet 15 arranged on the light guiding plate 13 for uniformly diffusing the light emitted from the light guiding plate 13, a prism sheet 16 arranged on the diffusion sheet 15 for transferring the light diffused and concentrated by the diffusion sheet 15 to the LC panel, a protection sheet 17 arranged on the prism sheet 16 for protecting the prism sheet 16, and a main supporting frame 18 for receiving and fixing the aforementioned elements therein.

A scattering pattern 13a may be further included in the lower surface of the light guiding plate 13 for scattering light and emitting the scattered light toward the LC panel. Light emitted from the lamp 11 of the backlight device is concentrated on a light incident face of the light guiding plate 13, sequentially passes through the light guiding plate 13, the diffusion sheet 15, and the prism sheet 16, and is transferred to an information display surface. In the light emitted from the backlight device, the light reflected by an edge portion of the LC panel and the light directly emitted from the backlight device interfere with each other, thereby preventing the emission of light stronger than the surroundings, and resulting in a bright line along an edge of the effective light irradiation region.

In order to solve this bright line problem, a method for forming a printed portion for the removal of the bright line at a light incident part of a sheet of the backlight device, has been developed.

FIG. 3 is a cross-sectional view of a backlight device according to the related art. In FIG. 3 the backlight device includes a printed portion 19 formed at a light incident part of the reflection sheet 14 beneath the light guiding plate 13 for the removal of the bright light.

FIG. 4 is a cross-sectional view of printed portion 19 of the reflection sheet 14 according to the related art. In FIG. 4, the printed portion 19 of the reflection sheet 14 includes black or any other color formed by a dot printing method. Accordingly, the bright line at a specific portion of the light incident part is either absorbed or irregularly reflected by the dot printed portion 19. In addition, to remove the bright line the dot printed portion 19 may be formed on the light incident part of either the reflection sheet or the protection sheet. However, this method has several drawbacks. For example, if the printed portion is displaced, a defect appearing to be a black line on the display area occurs, also the dot printing process is complicated and costs associated the printing process is increased.

However, in case the printed portion is displaced, a failure appearing to be a black line on the effective display area is formed, and also the dot printing process and the costs associated with the process are increased.

SUMMARY OF THE INVENTION

Accordingly, the present invention is directed to a backlight device and method that substantially obviate one or more problems due to limitations and disadvantages of the related art.

An object of the present invention is to provide a backlight device capable of decreasing bright line without a separate dot printing process.

Additional features and advantages of the invention will be set forth in part in the description which follows, and in part will be apparent from the description or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a backlight device including a light source, a light guiding plate arranged at one side of the light source for transferring light from the light source, at least one diffusion sheet and prism sheet sequentially arranged on the light guiding plate, a reflection sheet placed beneath the light guiding plate and having a stepped portion formed at a light incident portion thereof, and a main supporting frame housing the light source, the light guiding plate, the diffusion sheet, the prism sheet, and the reflection sheet.

In another aspect, a backlight device includes a lamp, a lamp housing for fixing the lamp and concentrating light emitted by the lamp, a light guiding plate for transferring the light emitted by the lamp, at least one diffusion sheet and prism sheet sequentially arranged on the light guiding plate, a protection sheet arranged on the prism sheet, a reflection sheet placed beneath the light guiding plate and having a light incident part of a twofold structure for reflecting the light emitted by the lamp toward the light guiding plate, and a main supporting frame housing the lamp, the lamp housing, the light guiding plate, the diffusion sheet, the prism sheet, the protection sheet, and the reflection sheet.

In another aspect, a method of forming a backlight device, includes the steps of forming a light source, forming a light guiding plate arranged at one side of the light source, for transferring a light emitted by the light source, forming at least one diffusion sheet and prism sheet sequentially arranged on the light guiding plate, forming a reflection sheet beneath the light guiding plate having a stepped portion formed at a light incident portion thereof, and forming a main supporting frame for housing the light source, the light guiding plate, the diffusion sheet, the prism sheet, and the reflection sheet.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
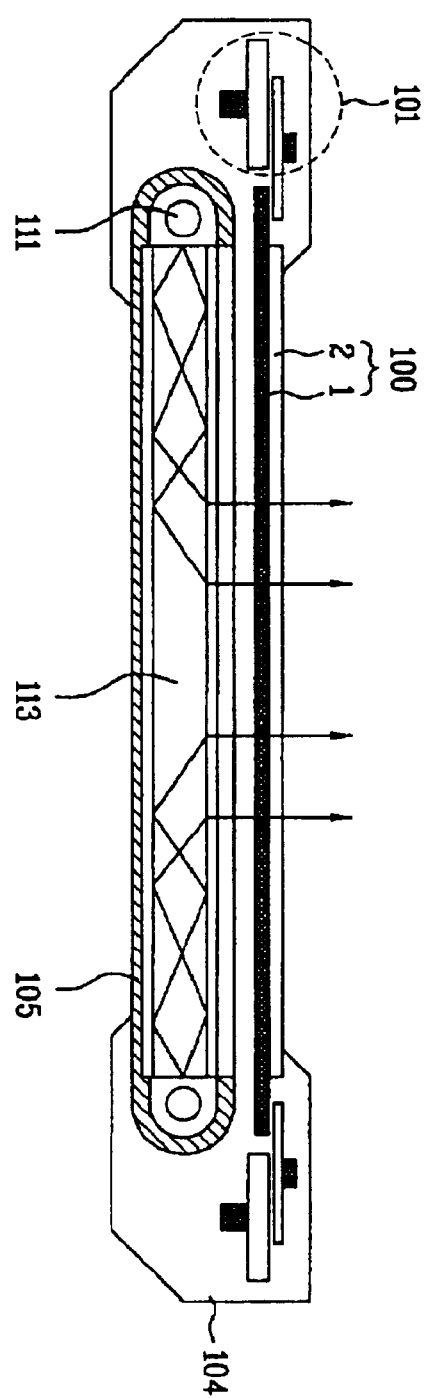
FIG. 1 is a cross-sectional view of a LCD device according to the related art.
Figure 2:
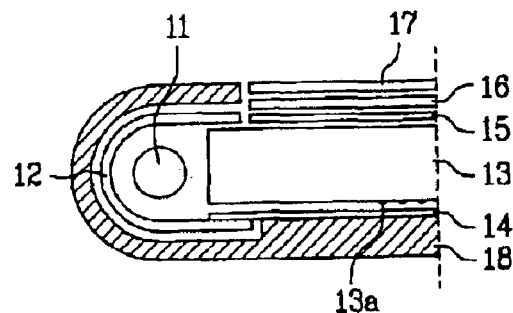
FIG. 2 is a cross-sectional view of a backlight device according to the related art.
Figure 3:
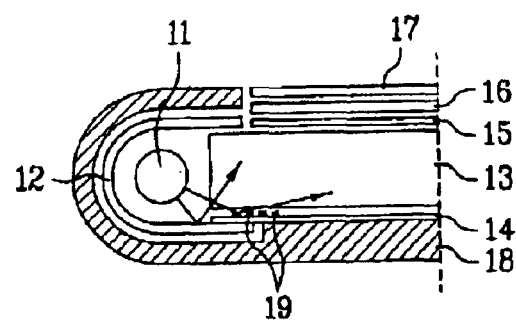
FIG. 3 is a cross-sectional view of a backlight device according to the related art.
Figure 4:
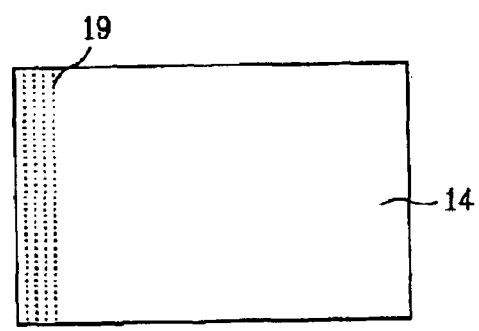
FIG. 4 is a plane view of a reflection sheet according to the related art.
Figure 5:
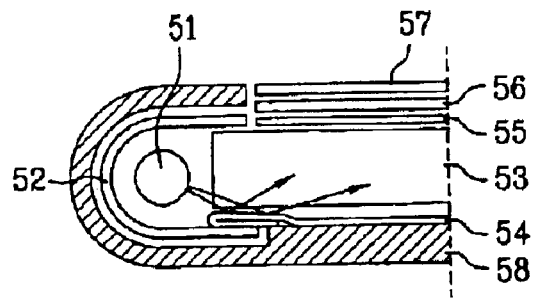
FIG. 5 is a cross-sectional view of an exemplary backlight device according to the present invention.

FIG. 5 is a cross-sectional view of an exemplary backlight device according to the present invention.

In FIG. 5, an edge light type backlight device may be arranged below an edge portion of the LC panel for displaying an image. The backlight device may include a light source 51 that may be a tube-shaped fluorescent lamp, for example, a lamp housing 52 for fixing the light source 51 and concentrating light of the light source 51, a light guiding plate 53 of an acrylic resin, for example, or the like in the form of thin plate, a reflection sheet 54 having a stepped portion for removing bright line, an optical sheet for diffusing and concentrating the emitted light from the light guiding plate 53 and allowing the concentrated light to be incident into the LC panel, the optical sheet may include a diffusion sheet 55, a prism sheet 56, and a protection sheet 57. A main supporting frame 58 may be provided for receiving the light source 51, the lamp housing 52, the light guiding plate 53, and an optical sheet that may include a diffusion sheet 55, a prism sheet 56 and a protection sheet 57.

The tube-shaped light source 51 may be positioned below the edge of the LC panel, and the light guiding plate 53 may be positioned adjacent to the light source 51 to transfer the light emitted from the light source 51 towards the LC panel. A colored scattering pattern may be printed on a bottom surface of the light guiding plate 53. Accordingly, the light emitted from the tube-shaped light source 51 may pass through the interior of the light guiding plate 53, scattered by the scattering pattern printed on the bottom surface of the light guiding plate 53, and then be emitted towards the LC panel. In addition, the diffusion sheet 55 and the prism sheet 56 may have an area slightly larger than the effective display area, and may be sequentially arranged on the light guiding plate 53. The diffusion sheet 55 uniformly diffuses the light emitted from the light guiding plate 53, and the prism sheet 56 concentrates the light diffused by the diffusion sheet 55 transferring the concentrated light towards the LC panel. The protection sheet 57 may be further arranged on the prism sheet 56 thereby protecting the prism sheet 56. The diffusion sheet 55 may include polyethylene terepthalate (PET) having a thickness of about 130 microns and have both surfaces on which diffusion particles are coated. The prism sheet 56 may utilize a lens having a thickness of about 170 microns and an apex angle of about 90°.

The reflection sheet 54 may be positioned beneath the light guiding plate 53 to reflect light leaked to the lower portion of the light guiding plate 53 towards the LC panel. The reflection sheet 54 may include a PET foam sheet having a thickness of about 200 microns.

Figure 6A:
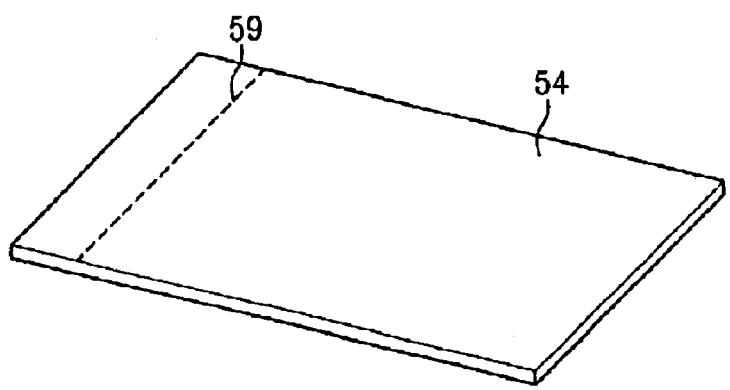
FIGS. 6A and 6B are perspective views of an exemplary reflection sheet according to the present invention.
Figure 6B:
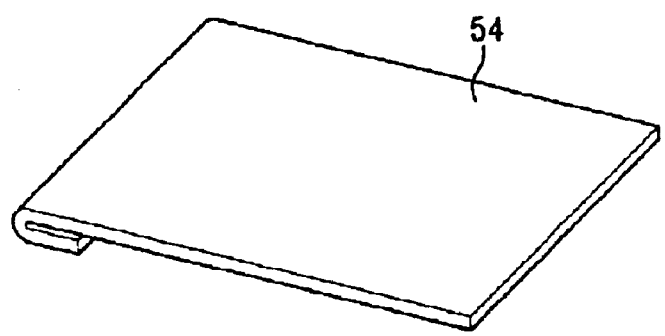

FIGS. 6A and 6B are perspective views of an exemplary reflection sheet according to the present invention.

In FIGS. 6A and 6B, the reflection sheet 54 may be characterized in that one edge portion thereof is folded downward to remove a bright line from the light incident part, thereby forming a stepped portion at the light incident part. For example, an outer edge portion with respect to the dotted line 59 may be folded downward to form the stepped portion at the light incident part. Accordingly, the dotted line 59 may be virtually set to exactly fold the reflection sheet 54. Thus, the reflection sheet 54 having the stepped portion formed at the light incident part thereof may be inserted between the light guiding plate and the lamp housing 52. Moreover, the light that is incident from the light incident part changes direction because of the stepped portion of the reflection sheet 54, as shown in FIG. 5, thereby removing the bright line at the light incident part.

It will be apparent to those skilled in the art that various modifications and variations can be made in the backlight device and method of fabricating the same without departing from the spirit or scope of the invention. Thus, it is intended that the present invention covers the modifications and variations of this invention provided they come within the scope of the appended claims and their equivalents.

What is claimed is:

1. A backlight device comprising:
    a light source;
    a light guiding plate arranged at one side of the light source for transferring light from the light source;
    at least one diffusion sheet and prism sheet sequentially arranged on the light guiding plate;
    a reflection sheet placed beneath the light guiding plate and having a stepped portion formed at a light incident portion thereof, wherein the stepped portion is formed by folding an edge portion of the reflection sheet; and
    a main supporting frame accommodating the light source, the light guiding plate, the diffusion sheet, the prism sheet, and the reflection sheet.

2. The device according to claim 1, wherein the diffusion sheet includes a polyethylene terepthalate (PET) sheet having a thickness of about 130 microns and having both surfaces on which diffusion particles are coated.

3. The device according to claim 1, wherein the prism sheet includes a lens having a thickness of about 170 microns and an apex angle of about 90°.

4. The device according to claim 1, wherein the reflection sheet includes a polyethylene terepthalate (PET) sheet having a thickness of about 200 microns.

5. The device according to claim 1, further comprising a lamp housing for fixing the light source.

6. The device according to claim 1, further comprising a protection sheet arranged on the prism sheet.

7. The device according to claim 1, further comprising a scattering pattern formed beneath the light guiding plate.

8. A backlight device comprising:
    a lamp;
    a lamp housing for fixing the lamp and concentrating light emitted by the lamp;
    a light guiding plate for transferring the light emitted by the lamp;
    at least one diffusion sheet and prism sheet sequentially arranged on the light guiding plate;
    a protection sheet arranged on the prism sheet;
    a reflection sheet placed beneath the light guiding plate and having a light incident part of a twofold structure for reflecting the light emitted by the lamp toward the light guiding plate, wherein the light incident portion of the reflection sheet is formed by folding an edge portion of the reflection sheet; and
    a main supporting frame receiving the lamp, the lamp housing, the light guiding plate, the diffusion sheet, the prism sheet, the protection sheet, and the reflection sheet.

9. The device according to claim 8, wherein the diffusion sheet is a polyethylene terepthalate (PET) sheet having a thickness of about 130 microns and having both surfaces on which diffusion particles are coated.

10. The device according to claim 8, wherein the prism sheet includes a lens having a thickness of about 170 microns and an apex angle of about 90°.

11. The device according to claim 8, wherein the reflection sheet includes a polyethylene terepthalate (PET) sheet having a thickness of about 200 microns.

12. The device according to claim 8, further comprising a scattering pattern formed beneath the light guiding plate.

13. A method of fabricating a backlight device, comprising the steps of:
    forming a light source;
    forming a light guiding plate at one side of the light source, for transferring a light emitted by the light source;
    forming at least one diffusion sheet and prism sheet sequentially arranged on the light guiding plate;
    forming a reflection sheet beneath the light guiding plate and having a stepped portion formed at a light incident portion thereof, wherein the stepped portion is formed by folding an edge portion of the reflection sheet; and
    forming a main supporting frame accommodating the light source, the light guiding plate, the diffusion sheet, the prism sheet, and the reflection sheet.

14. The method according to claim 13, wherein the diffusion sheet includes a polyethylene terepthalate (PET) sheet having a thickness of about 130 microns and having both surfaces on which diffusion particles are coated.

15. The method according to claim 13, wherein the prism sheet includes a lens having a thickness of about 170 microns and an apex angle of about 90°.

16. The method according to claim 13, wherein the reflection sheet includes a polyethylene terepthalate (PET) sheet having a thickness of about 200 microns.

17. The method according to claim 13, further comprising a lamp housing for fixing the light source.

18. The method according to claim 13, further comprising a protection sheet arranged on the prism sheet.

19. The method according to claim 13, further comprising a scattering pattern formed beneath the light guiding plate.

* * * * *